(12) United States Patent
Zhang et al.

(10) Patent No.: US 7,623,396 B2
(45) Date of Patent: Nov. 24, 2009

(54) METHOD AND APPARATUS FOR POWER REDUCTION ON A PROCESSOR BUS

(75) Inventors: Chunyu Zhang, Folsom, CA (US); Chris D. Matthews, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 11/726,910

(22) Filed: Mar. 22, 2007

(65) Prior Publication Data

US 2008/0288797 A1 Nov. 20, 2008

(51) Int. Cl.
*G11C 7/00* (2006.01)

(52) U.S. Cl. .................. 365/193; 365/233.1; 365/233.15

(58) Field of Classification Search .................. 365/193, 365/233.1, 233.15
See application file for complete search history.

(56) References Cited

OTHER PUBLICATIONS

Blaise Fanning, "Power Control Techniques for Bus Interfaces", U.S. Appl. No. 11/618,845, filed Dec. 31, 2006.

*Primary Examiner*—Hoai V Ho
*Assistant Examiner*—Kretelia Graham
(74) *Attorney, Agent, or Firm*—Matthew C. Fagan

(57) ABSTRACT

Power consumption of an address bus interface is reduced by reducing drive duration of address signals on the address bus. The address bus interface may operate in normal or power saving mode. In power saving mode, address signals are driven for a quarter of a clock period instead of half a clock period and address strobe edges are moved so that they are aligned with valid address signals.

18 Claims, 4 Drawing Sheets

METHOD AND APPARATUS FOR POWER REDUCTION ON A PROCESSOR BUS

FIELD

This disclosure relates to reduction of power consumption and in particular to power consumption reduction on a processor bus.

BACKGROUND

Typically, a processor's address bus drives each separate signal on the address bus for the duration of a half of a host clock period. These address buses are typically 'source synchronous', that is, a clock, or address strobe, is transmitted along with the individual signals on the address bus. Typically, the rising and falling edges of the address strobe are aligned with the center of each address signal.

While driving a signal on the address bus to logical 0, direct current (DC) is consumed by a pull up termination resistor at the receiving side of the signal on the address bus. A pull-up termination resistor is typically on the order of 55 ohms. With a voltage level of about 0.9 volts (V), due to the direct current consumed, the maximum power consumed is about 16 milli-Watts (mW) per signal on the address bus. The half a host clock period requirement is primarily driven by the need to meet setup and hold timing on bus lines that are operating over a great distance of about one foot and is operating at the maximum plausible frequency for that bus, given its technology generation.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The long drive duration of an address signal can be overkill in very small devices such as an ultra-mobile personal computer (PC) because trace lengths, that is, the length of traces that connect transmitter outputs to receiver inputs, are much shorter. Due to the reduced signal propagation time in a device with shorter trace lengths, the signal at the receiver end of the trace line settles to a stable level quicker. Thus, a setup requirement at the receiver end of the trace line, for example, the time that a signal state needs to be stable prior to a falling or rising clock edge, may be met by a signal having a shorter duration.

In an embodiment of the present invention, while in a power saving mode, the signals on the address bus are driven for a quarter of a clock period instead of a half clock period. In one embodiment, a bus interface that includes a driver to drive address bus signals may operate in a traditional (normal) non-power savings mode or in a power saving mode.

The driver may use Gunning Transceiver Logic (GTL) to drive the signals. GTL is defined in Joint Electron Device Engineering Council (JEDEC) standard JESD 8-3.

Figure 1:
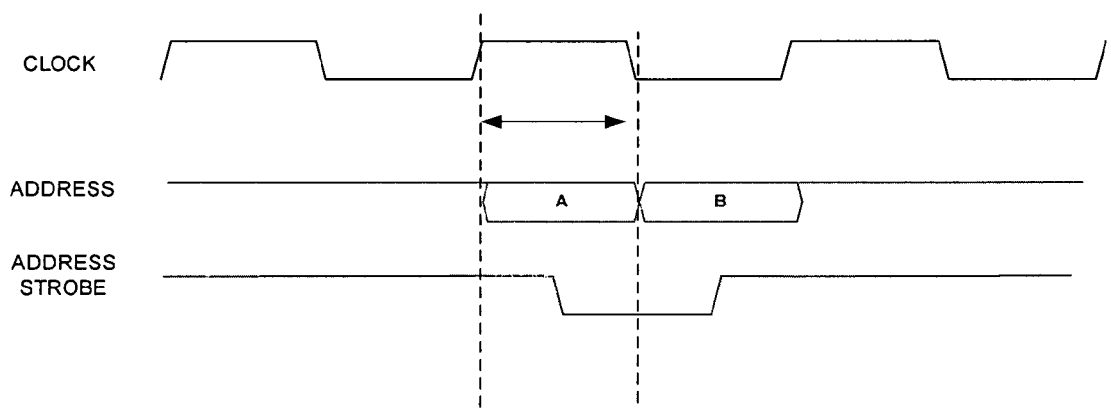
FIG. 1 is a timing diagram illustrating address signal and address strobe signal timing provided by a traditional address bus interface.

FIG. 1 is a timing diagram illustrating address signal and address strobe signal timing provided by a traditional address bus interface. An example of a traditional address bus interface is the address bus interface in an Intel® Pentium® 4 (P4) processor.

As shown in FIG. 1, each signal (A, B) on the address bus is valid for half of the host clock period. The A signal on the address bus is valid on the falling edge of the address strobe signal. The B address signal is valid on the rising edge of the address strobe signal.

According to an embodiment of the present invention, in the power saving mode each address signal is valid for a quarter of the clock period instead of a half of the clock period. In addition, the address strobe timing is modified in order to capture address signals when they are valid.

Figure 2:
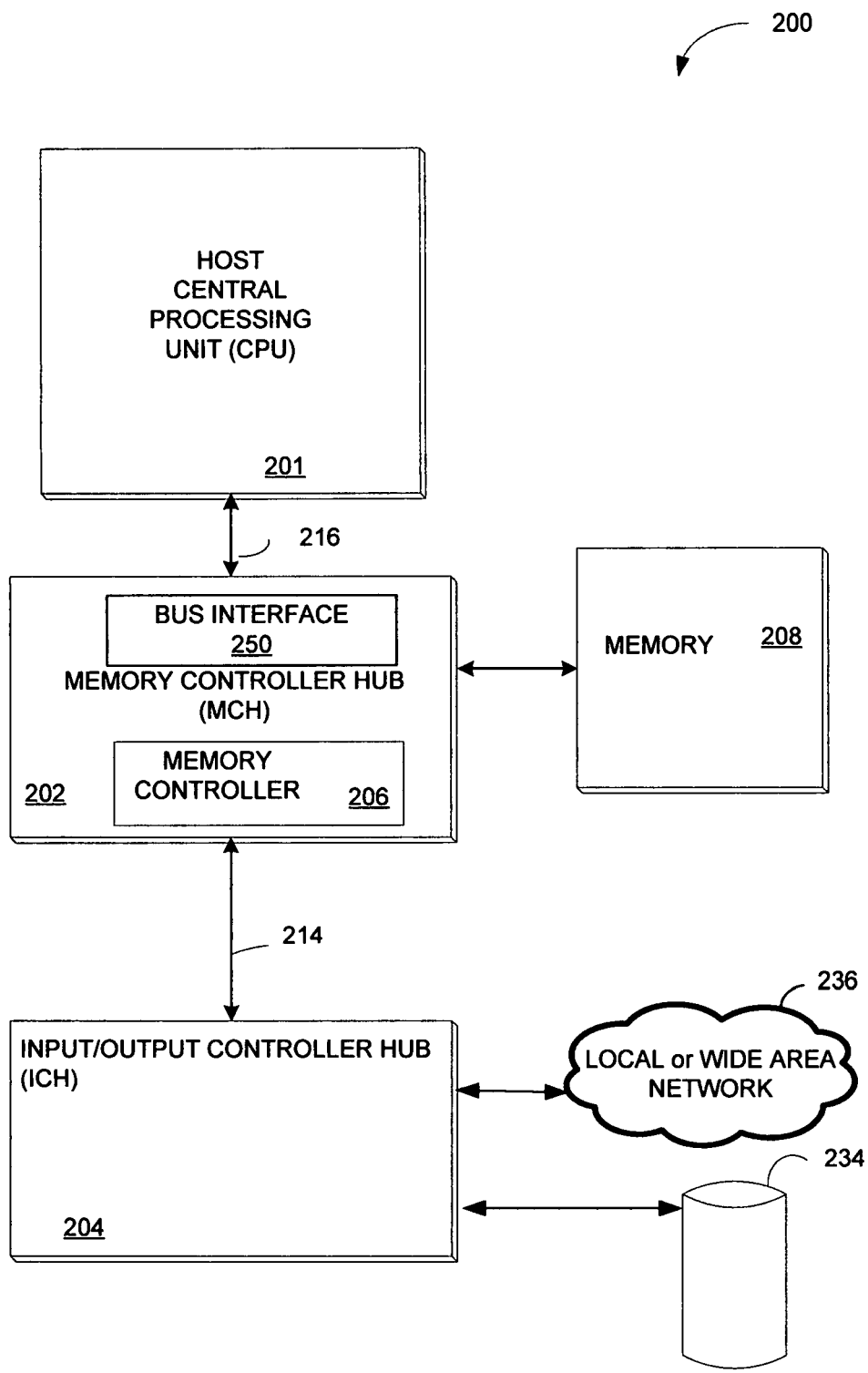
FIG. 2 is a block diagram of a system that includes an embodiment of a bus interface according to the principles of the present invention.

FIG. 2 is a block diagram of a system 200 that includes an embodiment of a bus interface 250 according to the principles of the present invention. The system 200 includes a Host Central Processing Unit (CPU) 201 and a chipset that includes an Input/Output (I/O) Controller Hub (ICH) 204 and a Memory Controller Hub (MCH) 202.

The MCH 202 manages a memory 208 that is coupled to the MCH 202. The memory 208 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory. In the embodiment shown, the bus interface 250 is included in the MCH 202.

The CPU (processor) 201 is coupled to the MCH 202 by a host interface 216. The ICH 204 may be coupled to the MCH 202 using a high speed chip-to-chip interconnect 214 such as Direct Media Interface (DMI). DMI supports 2 Gigabit/second concurrent transfer rates via two unidirectional lanes.

The ICH 204 manages I/O devices including storage devices coupled to a storage interface 234. The ICH 204 may also include a storage controller for controlling access to storage device(s) 234 coupled to the ICH 204. The storage devices controlled by the ICH 204 may include a Digital Video Disk (DVD) drive, compact disk (CD) drive, Redundant Array of Independent Disks (RAID), or tape drive. The storage controller may communicate with the storage device (s) 234 using storage protocols such as Serial Advanced Technology Attachment (SATA), Fibre Channel, and Small Computer System Interface (SCSI).

The ICH 204 may include a system bus controller for controlling communication with other devices over a Local or Wide Area Network 236.

Figure 3:
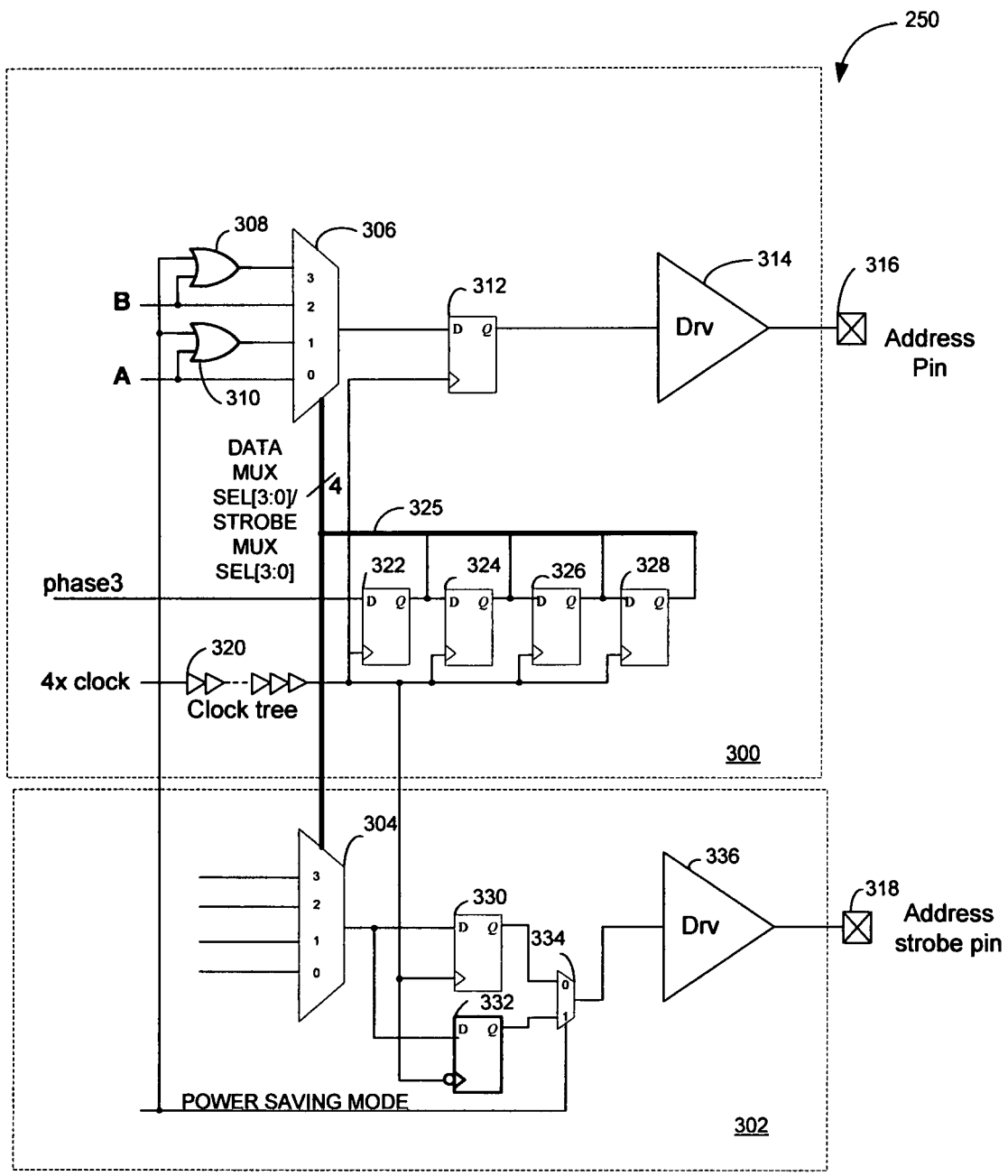
FIG. 3 is a circuit diagram of an embodiment of the bus interface shown in FIG. 1.

FIG. 3 is a circuit diagram of an embodiment of the bus interface 250 shown in FIG. 2. The bus interface 250 includes address signal logic 300 and address strobe logic 302.

The address signal logic 300 in the bus interface 250 converts four address bits to a serial format. The address bits are output on address pin 316. The four address bits are transmitted serially through an address pin 316 in one clock period of a host clock. The four address bits are first input to a 4:1 multiplexer (mux) 306 which based on mux control signals 325 selects one of the four address bits to be transmitted to the output of the 4:1 multiplexer 306. Each of the four address bits is transmitted for a quarter of the clock period of the host clock.

The four mux control signals 325 to control the 4:1 multiplexer 306 are each coupled to a respective one of four outputs of 4 latches (D-type flip-flops) 322, 324, 326, 328. The 4 latches 322, 324, 326, 328 are connected in series. A 4× clock having a frequency that is four times the clock frequency of the host clock is provided to the clock input of each of the latches 322, 324, 326, 328 through clock tree 320A.

A phase3 signal is derived from the 4× clock is set to logical 1 for the third quarter (phase 3) of the clock period of the host clock. The phase3 signal is coupled to the D input of latch 322. The Q output of latch 324 is coupled to the D input of latch 326 and the Q output of latch 326 is coupled to the D input of latch 328.

The address signals (A, B) are coupled to the inputs of two OR-gates 308, 310 and to inputs of the 4:1 multiplexer 306. One of the inputs of each OR-gate 308, 310 is coupled to a respective one of the address signals (A, B). The other input of each OR-gate 308, 310 is coupled to a power saving mode enable signal. The power saving mode enable signal allows the bus interface 250 to be used both for power saving mode and non-power saving (normal) mode.

When the bus interface 250 is in non-power saving mode, that is the power saving mode enable signal is logical 0, a logical 0 on one of the inputs of each OR gate 308, 310, the address signals (A, B) are output from the respective OR gates 308, 310 and through to the output of the 4:1 multiplexer 306 for half of the clock period as shown in FIG. 1.

When the bus interface 250 is in power saving mode, that is, the power saving mode enable signal is active high (logical 1), with a logical 1 on one of the inputs of each OR gate 308, 310 a logical 1 is output from each OR gate 308, and output through to the output of the 4:1 multiplexer 306 for half of the clock period. Thus, in power saving mode, a logical 1 is output for half of the clock period instead of the address signals (A, B).

The D input of latch 312 is coupled to the output of 4:1 multiplexer 306 to synchronize the output of the 4:1 multiplexer 306 with a leading edge of the 4× clock before it is forwarded to an address pin driver 314. The synchronized address signal (A, B) is output from the address pin driver 314 through the address pin 316 that is coupled to the output of the address pin driver 314.

When the bus interface 250 is operating in non-power saving mode, that is, the power saving mode enable signal is logical 0, address signals AABB are transmitted through the address pin 316 in one clock period as shown in FIG. 1. Thus, two different address signals, A and B, are presented on the address pin 316, with each address signal transmitted for a half of the clock period.

When the bus interface 250 is operating in power saving mode, with the power saving mode enable signal set to logical 1, address signals A1B1 are transmitted on the address pin in one clock period. Thus, address signals A or B are each only transmitted for a quarter of a clock period, with a logical 1 being transmitted in each of the quarter of a clock periods between the address signals gaps. This results in a power saving because the transmission of a logical 1 instead of address signals for half of the clock period does not consume DC power.

In power savings mode the relative position of the address strobe signal with respect to the clock period is also modified in the address strobe logic 302. The address strobe logic 302 includes a 4:1 multiplexer 304 that controls the timing of the address strobe signal transmitted on the address strobe pin 318. The address strobe logic 302 in the bus interface 250 generates an address strobe signal based on address strobe control signals coupled to inputs of the 4:1 multiplexer 304. The address strobe signal is output on the address strobe pin 318.

In non-power saving mode, the address strobe inputs are set to '1001'. The 4:1 multiplexer 304 is controlled by mux control signals 325. The state of the mux control signals 325 controls the output of the 4:1 multiplexer 304 during each period of the 4× clock (or quarter period of the host clock). With address strobe inputs at the inputs of the 4:1 multiplexer 304 set to '1001', the address strobe signal 318 is driven to logical 1 for the first quarter of the host clock period, to logical 0 for the next half the host clock period and to logical 1 for the fourth quarter of the host clock period.

The output of 4:1 multiplexer 304 is coupled to the D input of latch 330 and to the D-input of latch 332. Latch 330 synchronizes the output of the 4:1 multiplexer 304 with the leading (rising) edge of the 4× clock and latch 332 synchronizes the 4:1 multiplexer with the falling edge of the 4× clock. A 2:1 multiplexer 334 that is controlled by the power saving mode enable signal provides the synchronized address strobe signal to the input of an address strobe driver 336. The output of the address strobe driver 336 is coupled to the address strobe pin 318.

In power saving mode, with each address signal (A, B) only valid for a quarter of the clock period, the falling edge and rising edge of the address strobe signal are moved within the clock period to align one edge with the valid address signal A and the other edge with the valid address signal B.

In one embodiment, during power saving mode, the address strobe inputs from the core are set to logical '0011' with logical 1 on inputs 3 and 2 of the 4:1 multiplexer 304 and logical 0s on inputs 1 and 0 of the 4:1 multiplexer 304. Through 2:1 multiplexer 334, the falling and rising edges of the address strobe signal that is output from the 4:1 multiplexer 304 are aligned with the falling edge of the 4× clock instead of the rising edge of the 4× clock in non-power saving mode. This provides an address strobe signal with a falling edge that is shifted by one eighth of the clock period such that it occurs earlier because each address signal is only valid for a quarter of the clock period instead of for a half of the clock period.

Thus, the reduction of drive duration can also be viewed as an earlier ending. of a signal interval while shifting forward by an eighth of a clock period so that the address strobe rising and falling edges are generated earlier in the clock period.

Figure 4:
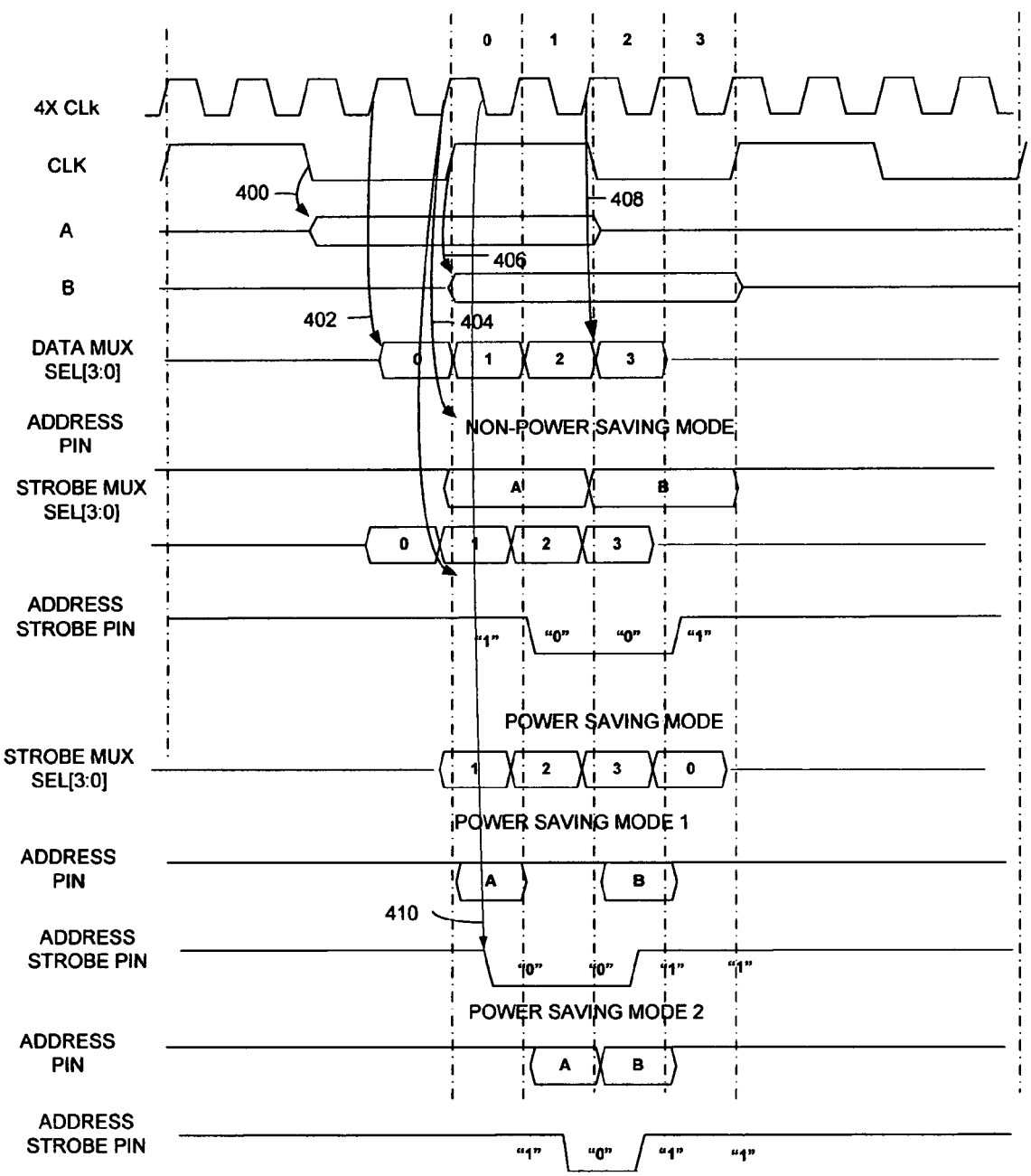
FIG. 4 is a timing diagram illustrating the relationship between signals in the circuit diagram shown in FIG. 3.

FIG. 4 is a timing diagram illustrating the relationship between signals in the circuit diagram shown in FIG. 3. A 4× clock is derived from a clock. As shown in FIG. 4, the 4× clock (4×CLK) has a clock period that is a quarter of the clock period of the clock (CLK).

The timing diagram illustrates operation of the circuit in (1) normal (non-power saving mode); (2) power saving mode 1 and (3) power saving mode 2.

Referring to FIG. 4, at time 400, on the falling edge of the clock (CLK), the A address data is valid at the '0' input of the 4:1 mux 306. At time 406, after the rising edge of the clock (CLK), the B address data is valid at the '2' input of the 4:1 mux 304.

In non-power saving (normal) mode, the A address data is valid for half the CLK period at the '0' and '1' inputs of the 4:1 mux 306 and the B address data is valid for the other half of the CLK period at the '2' and '3' inputs of the 4:1 mux 306.

At time 402, after the rising edge of the 4× CLK, the data mux select control [3:0] 325 selects the '0' input of the 4:1 mux 306. At time 404, after the rising edge of the 4× CLK, the A address data on the output of the 4:1 mux 306 and the D-input of latch 312 is latched on the Q-output of latch 312 and is forwarded through driver 314 to address pin 316. At time 406, on the rising edge of CLK, the B address data is valid on the '2' and '3' inputs of the 4:1 mux 306. At time 408, on the rising edge of the 4× CLK after the data mux select [3:0] 325 selects input '2', the B address data on the output of the 4:1 mux 306 is latched by latch 312 and is forwarded through driver 314 to address pin 316. The address strobe 4:1 mux 304 receives an input of 0011 on inputs [3:0] and generates an address strobe with a falling edge occurring when A address data is valid on the address pin 316 and a rising edge occurring when B address data is valid on the address pin 316.

In power saving mode, address data is driven on the address pin for 50% of the clock period instead of for the entire clock period as shown in FIG. 4. Two different power saving modes may be configured.

The bus interface 250 shown in FIG. 3 is configured for power saving mode 1. In power saving mode 1, with power saving mode signal set to logical 1, the A address data is output on address pin 316 for the first quarter of the clock period, a logical 1 is output on the address pin 316 for the second quarter of the clock period, the B address data is output on address pin 316 for the third quarter of the clock period and a logical 1 is output on the address pin 316 for the fourth quarter of the clock period. Address strobe control signals [3:0] at the input of 4:1 multiplexer 304 are set to '0011' to generate rising and falling edges of the address strobe signal so that they occur when the A address data and B address data is valid on the address pin 316 as shown in FIG. 4.

As shown in FIG. 4, in power saving mode 2, address data is valid during the second quarter and third quarter of the clock period and a logical 1 is output on address pin during the first quarter and fourth quarter of the clock period. The address strobe timing is modified through the 4:1 mux 304 by setting the inputs of the 4:1 mux 304 to '1011' so that the falling edge at 410 and rising edge of the address strobe signal occurs when the A address data and B address data is valid on the address pin 316.

In order to operate in power saving mode 2, the address signal logic 300 is modified by coupling the output of OR gate 310 to input '0' of 4:1 mux 306 instead of input '1'. In addition, the A address data to input '1' of 4:1 mux instead of input '0' of 4:1 mux 306.

The transmission of a logical 1 for half of the clock period does not consume DC power. Thus, the power saving per address pin is roughly 50%. Address signals are typically active up to half the time while the processor is in the normal operating state, which may also be referred to as a C0 state. Even so, the power savings is significant, because of the large number of address pins. For example, for a 32-bit address bus, during maximum-bandwidth operation, the power savings is 128 milli Watts (mW) which is computed as follows:

Power Savings=32 pins×½ time×50% per pin×16 mW=128 mW.

An embodiment of the invention exploits a constrained electrical environment to deliver a compatible, yet lower-power solution. The reduction in power allows a device that includes the bus interface to have a smaller form factor and thermal envelope.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
    address signal logic, the address signal logic to operate in a power savings mode by driving an address signal for a quarter of a clock period and to transmit a logical 1 while the address signal is not driven; and
    address strobe logic, the address strobe logic to operate in the power savings mode by aligning an edge of an address strobe with a valid address signal.

2. The apparatus of claim 1, wherein the clock period is a first clock period, and
    wherein the address signal logic is to operate in a normal mode by driving a first address signal for a half of a second clock period and a second address signal for another half of the second clock period.

3. The apparatus of claim 2, wherein in normal mode, the address strobe logic is to align edges of the address strobe to rising edges of a 4× clock having a third clock period that is a quarter of the second clock period.

4. The apparatus of claim 1, wherein the address signal logic is to drive a first address signal for one quarter of the clock period and a second address signal for another quarter of the clock period, and
    wherein the address strobe logic is to align a falling edge of the address strobe with the first address signal and a rising edge of the address strobe with the second address signal.

5. The apparatus of claim 1, wherein in the power savings mode, the address strobe logic is to align edges of the address strobe to falling edges of a 4× clock having another clock period that is a quarter of the clock period.

6. The apparatus of claim 1, wherein in the power savings mode, the address signal logic is to drive a first address signal for a first quarter of the clock period and a second address signal for a third quarter of the clock period.

7. The apparatus of claim 1, wherein in the power savings mode, the address signal logic is to drive a first address signal for a second quarter of the clock period and a second address signal for a third quarter of the clock period.

8. A method comprising:
    upon detecting a power savings mode, driving an address signal on an address line for a quarter of a clock period;
    transmitting a logical 1 on the address line while the address signal is not driven; and
    aligning an edge of an address strobe with the address signal while the address signal is valid.

9. The method of claim 8, wherein the clock period is a first clock period, and
    wherein the method comprises:
    upon detecting a normal mode, driving a first address signal for a half of a second clock period and a second address signal for another half of the second clock period.

10. The method of claim 9, wherein in the normal mode, aligning comprises:

aligning edges of the address strobe to rising edges of a 4× clock having a third clock period that is a quarter of the second clock period.

11. The method of claim 8, wherein a first address signal is driven for one quarter of the clock period and a second address signal is driven for another quarter of the clock period, a falling edge of the address strobe aligned with the first address signal and a rising edge of the address strobe aligned with the second address signal.

12. The method of claim 8, wherein aligning comprises:

aligning edges of the address strobe to falling edges of a 4× clock having another clock period that is a quarter of the clock period.

13. The method of claim 8, wherein a first address signal is driven for a first quarter of the clock period and a second address signal is driven for a third quarter of the clock period.

14. The method of claim 8, wherein a first address signal is driven for a second quarter of the clock period and a second address signal is driven for a third quarter of the clock period.

15. The apparatus of claim 1, wherein the address signal logic is to drive a first address signal for only one quarter of the clock period and a second address signal for only another quarter of the clock period.

16. The apparatus of claim 15, wherein the address strobe logic is to align an edge of the address strobe with the first address signal and another edge of the address strobe with the second address signal.

17. The method of claim 8, wherein a first address signal is driven for only one quarter of the clock period and a second address signal is driven for only another quarter of the clock period.

18. The method of claim 17, wherein an edge of the address strobe is aligned with the first address signal and another edge of the address strobe is aligned with the second address signal.

* * * * *